(12) United States Patent
Brennan

(10) Patent No.: US 6,193,448 B1
(45) Date of Patent: Feb. 27, 2001

(54) DEBRIS CAPTURING DEVICE FOR POWER DRILL

(76) Inventor: Martin J. Brennan, 172 Veterans Plaza, Dumont, NJ (US) 07628

( * ) Notice: Subject to any disclaimer, the term of this patent is extended or adjusted under 35 U.S.C. 154(b) by 0 days.

(21) Appl. No.: 09/357,294

(22) Filed: Jul. 20, 1999

(51) Int. Cl.[7] .................................................. B23B 47/00
(52) U.S. Cl. .......................................... 408/67; 408/72 R
(58) Field of Search ................................... 408/67, 72 R

(56) References Cited

U.S. PATENT DOCUMENTS

| | | | |
|---|---|---|---|
| 3,583,821 | * | 6/1971 | Shaub ...................................... 408/67 |
| 3,936,213 | * | 2/1976 | Kappel ..................................... 408/67 |
| 5,160,230 | * | 11/1992 | Cuevas ..................................... 408/67 |
| 5,292,210 | * | 3/1994 | Norwick ................................... 408/67 |
| 5,653,561 | * | 8/1997 | May ......................................... 408/67 |
| 5,688,082 | * | 11/1997 | Richardson ............................. 408/67 |
| 5,983,445 | * | 11/1999 | Baker ....................................... 408/67 |

FOREIGN PATENT DOCUMENTS

| | | | |
|---|---|---|---|
| 2317779 | * | 10/1974 | (DE) ....................................... 408/67 |
| 3133066 | * | 3/1983 | (DE) ....................................... 408/67 |
| 222222 | * | 5/1985 | (DE) ....................................... 408/67 |
| 278079 | * | 4/1990 | (DE) ....................................... 408/67 |
| 2912396 | * | 10/1990 | (DE) ....................................... 408/67 |
| 2211117 | * | 6/1989 | (GB) ....................................... 408/67 |

* cited by examiner

Primary Examiner—A. L. Wellington
Assistant Examiner—Monica S. Carter

(57) ABSTRACT

A debris capturing device for a power drill. The device includes a drill engaging-collar and a debris capturing-cup. The debris capturing-cup detachably extends axially from the drill engaging-collar and encircles the chuck of the power drill and contacts the workpiece so as to allow debris created from the power drill drilling into the workpiece to be captured therein. In one embodiment, the drill engaging-collar detachably engages around the housing of the power drill, just behind the chuck of the power drill. In another embodiment, the drill engaging-collar is integrally formed with and around the housing of the power drill, just behind the chuck of the power drill.

14 Claims, 2 Drawing Sheets

DEBRIS CAPTURING DEVICE FOR POWER DRILL

BACKGROUND OF THE INVENTION

1. Field of the Invention

The present invention relates to a debris capturing device. More particularly, the present invention relates to a debris capturing device for a power drill.

2. Description of the Prior Art

When drilling through many materials, dust, chips, and debris results from the drilling operation. In closed inside areas this leads to dirt formation in the room and dust deposition on the objects, and interference with the operator of the tool. This is the case in particular when, for example, holes must be drilled vertically upward.

Numerous innovations for debris capturing devices for drills have been provided in the prior art that will be described. Even though these innovations may be suitable for the specific individual purposes to which they address, however, they differ from the present invention.

FOR EXAMPLE, U.S. Pat. No. 3,936,213 to Kappel teaches a collector for use on or in association with drills or other tools which in use produce dust, splinters, powder, chips, shavings or other debris. It comprises a hollow annular housing which can be attached to the working component of the tool in the vicinity of the operating part.

ANOTHER EXAMPLE, U.S. Pat. No. 4,064,952 to Lechner teaches a device attachable to a power drill for the collection and removal of material released during drilling procedures. A collecting tube is mounted by a clamp parallel to the longitudinal axis of the power drill, and is movable relative to the power drill. A spout surrounds the drill bit near the tip area. Pressure is applied to the collecting tube or to the spout in closing the drill bit by a spring, so that the collecting tube can have relative motion in the opposite direction, in accordance with the progress of the drilling. The collecting tube is adapted to the contour of the power drill and has a bend in the vicinity of the spout. The collecting tube has, furthermore, a storage space for the material released during the drilling.

STILL ANOTHER EXAMPLE, U.S. Pat. No. 4,848,980 to Broussard teaches a corrugated rubber device encompassing a relatively rigid and yet expandable larger end to provide a snug fit on the drilling end of electric drills. This corrugated rubber device has recoil capabilities to accommodate the penetration of the drill bit as it progressively sinks to the depth required. This body has a transparent end to facilitate the observation of the accurate start of the drill bit, the transparent end is a holding area to accumulate dust and debris. It has a rubber tip to protect the paint or other surface being drilled.

YET ANOTHER EXAMPLE, U.S. Pat. No. 5,419,663 to Psomas teaches a dust guard that fits onto the stationary housing of a portable electric drill with a resilient annular terminal portion. An elongate, axially compressible, elastic cylindrical body portion extends from the terminal portion, surrounding the drill bit and forming a chamber to receive debris and dust from the drilling process. The free end of the body portion is provided with a resilient, non-marring annular end piece for engaging the surface of the workpiece being drilled. As the drill bit penetrates the workpiece, the end piece is forced against the body portion, causing it to elastically shorten. The terminal portion has external screw threads, and adapters with mating screw threads are provided. These adapters have progressively greater inside diameters for engaging drill housings having greater diameters than those that would fit the terminal portion.

It is apparent that numerous innovations for debris capturing devices for drills have been provided in the prior art that are adapted to be used. Furthermore, even though these innovations may be suitable for the specific individual purposes to which they address, however, they would not be suitable for the purposes of the present invention as heretofore described.

SUMMARY OF THE INVENTION

ACCORDINGLY, AN OBJECT of the present invention is to provide a debris capturing device for a power drill that avoids the disadvantages of the prior art.

ANOTHER OBJECT of the present invention is to provide a debris capturing device for a power drill that is simple and inexpensive to manufacture.

STILL ANOTHER OBJECT of the present invention is to provide a debris capturing device for a power drill that is simple to use.

BRIEFLY STATED, YET ANOTHER OBJECT of the present invention is to provide a debris capturing device for a power drill. The device includes a drill engaging-collar and a debris capturing-cup. The debris capturing-cup detachably extends axially from the drill engaging-collar and encircles the chuck of the power drill and contacts the workpiece so as to allow debris created from the power drill drilling into the workpiece to be captured therein. In one embodiment, the drill engaging-collar detachably engages around the housing of the power drill, just behind the chuck of the power drill. In another embodiment, the drill engaging-collar is integrally formed with and around the housing of the power drill, just behind the chuck of the power drill.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

The figures of the drawing are briefly described as follows.

Figure 1:
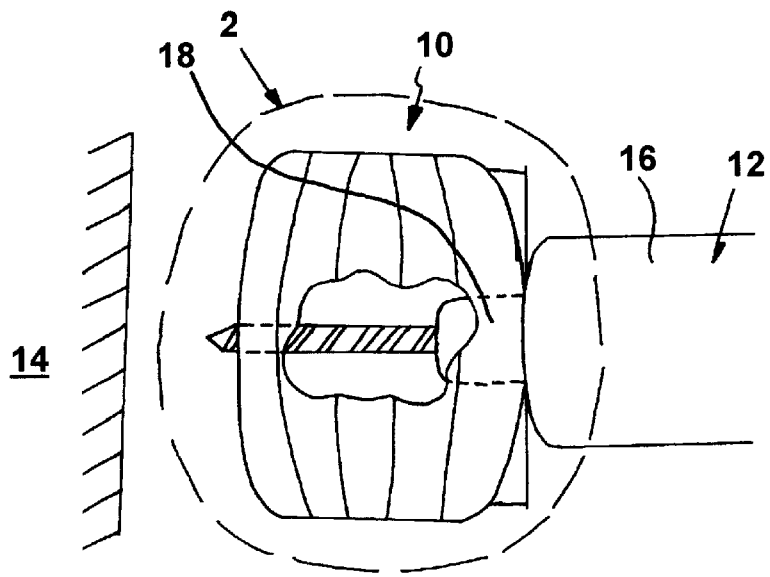
FIG. 1 is a diagrammatic perspective view of the present invention in use.

LIST OF REFERENCE NUMERALS UTILIZED IN THE DRAWING 10 debris capturing device of present invention for power drill 12 for drilling into workpiece 14

12 power drill for drilling into workpiece 14

14 workpiece
16 housing of power drill 12
18 chuck of power drill 12
20 drill engaging-collar for detachably engaging around housing 16 of power drill 12, just behind chuck 18 of power drill 12
22 debris capturing-cup for encircling chuck 18 of power drill 12 and for contacting workpiece 14 so as to allow debris created from power drill 12 drilling into workpiece 14 to be captured therein
23 disk of drill engaging-collar 20
24 drill receiving-throughbore in disk 23 of drill engaging-collar 20
26 detachable inner circumferential wall defining drill receiving-throughbore 24 in disk 23 of drill engaging-collar 20 for detachably receiving housing 16 of power drill 12
28 outer periphery of disk 23 of drill engaging-collar 20
29 fixed outer circumferential wall on outer periphery 28 of disk 23 of drill engaging-collar 20
30 cup facing-surface of disk 23 of drill engaging-collar 20
31 disk-engaging-prong on one end of ends 36 of each halve of two identical halves 34 of disk 23 of drill engaging-collar 20
32 concentric break lines in disk 23 of drill engaging-collar 20 for adjusting size of drill receiving-throughbore 24 therein to accommodate for housings 16 of different sized power drills 12
33 disk-engaging recess in other end of ends 36 of each halve of two identical halves 34 of disk 23 of drill engaging-collar 20
34 two identical halves of disk 23 of drill engaging-collar 20
36 ends of two identical halves 34 of disk 23 of drill engaging-collar 20
38 cup engaging-tab on each half of two identical halves 34 of disk 23 of drill engaging-collar 20
39 wedge of cup engaging-tab 38 on each half of two identical halves 34 of disk 23 of drill engaging-collar 20
40 disk engaging-tab on each half of two identical halves 34 of disk 23 of drill engaging-collar 20
42 wedge of disk engaging-tab 40 on each half of two identical halves 34 of disk 23 of drill engaging-collar 20
44 disk engaging-sleeve under each half of two identical halves 34 of disk 23 of drill engaging-collar 20
46 disk engaging-bore in each half of two identical halves 34 of disk 23 of drill engaging-collar 20
48 plurality of telescopic sleeves of debris capturing cup 22
50 interconnecting springs of plurality of telescopic sleeves 48 of debris capturing cup 22
52 inner terminal end of innermost sleeve of plurality of telescopic sleeves 48 of debris capturing cup 22
54 pair of cup engaging-bores in innermost sleeve of plurality of telescopic sleeves 48 of debris capturing cup 22

DETAILED DESCRIPTION OF THE PREFERRED EMBODIMENT

Referring now to the figures, in which like numerals indicate like parts, and particularly to FIG. 1, which is a diagrammatic perspective view of the present invention in use, the debris capturing device of the present invention is shown generally at 10 for a power drill 12 for drilling into a workpiece 14, wherein the power drill 12 has a housing 16 and a chuck 18.

Figure 2:
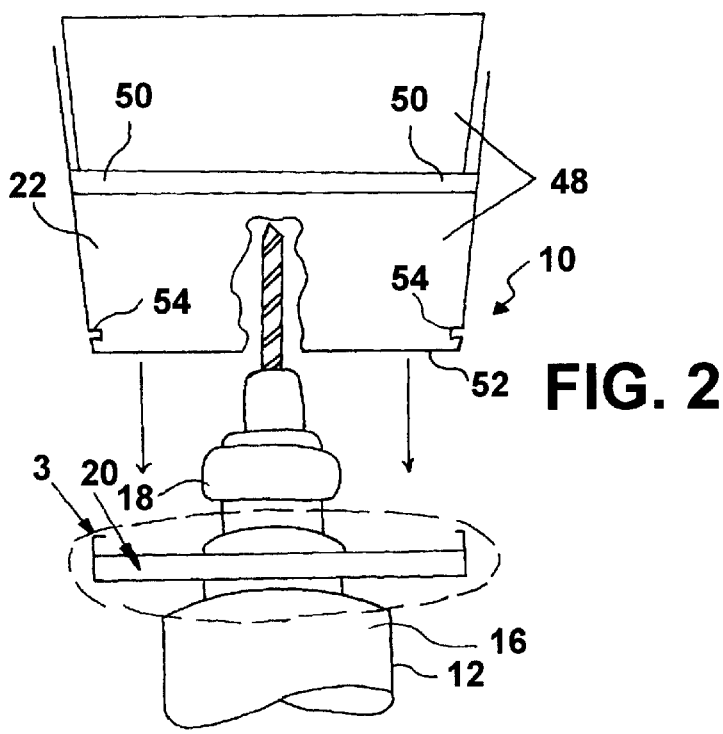
FIG. 2 is an enlarged exploded diagrammatic side elevational view of the area generally enclosed by the dotted curve identified by ARROW 2 in FIG. 1 of the present invention.

The overall configuration of the debris capturing device 10 can best be seen in FIG. 2, which is an enlarged exploded diagrammatic side elevational view of the area generally enclosed by the dotted curve identified by ARROW 2 in FIG. 1 of the present invention, and as such, will be discussed with reference thereto.

The debris capturing device 10 comprises a drill engaging-collar 20.

The drill engaging-collar 20 is for detachably engaging around the housing 16 of the power drill 12, just behind the chuck 18 of the power drill 12.

Alternatively, the drill engaging-collar 20 is integrally formed with and around the housing 16 of the power drill 12, just behind the chuck 18 of the power drill 12.

The debris capturing device 10 further comprises a debris capturing-cup 22 detachably extending axially from the drill engaging-collar 20 for encircling the chuck 18 of the power drill 12 and for contacting the workpiece 14 so as to allow debris created from the power drill 12 drilling into the workpiece 14 to be captured therein.

Figure 3:
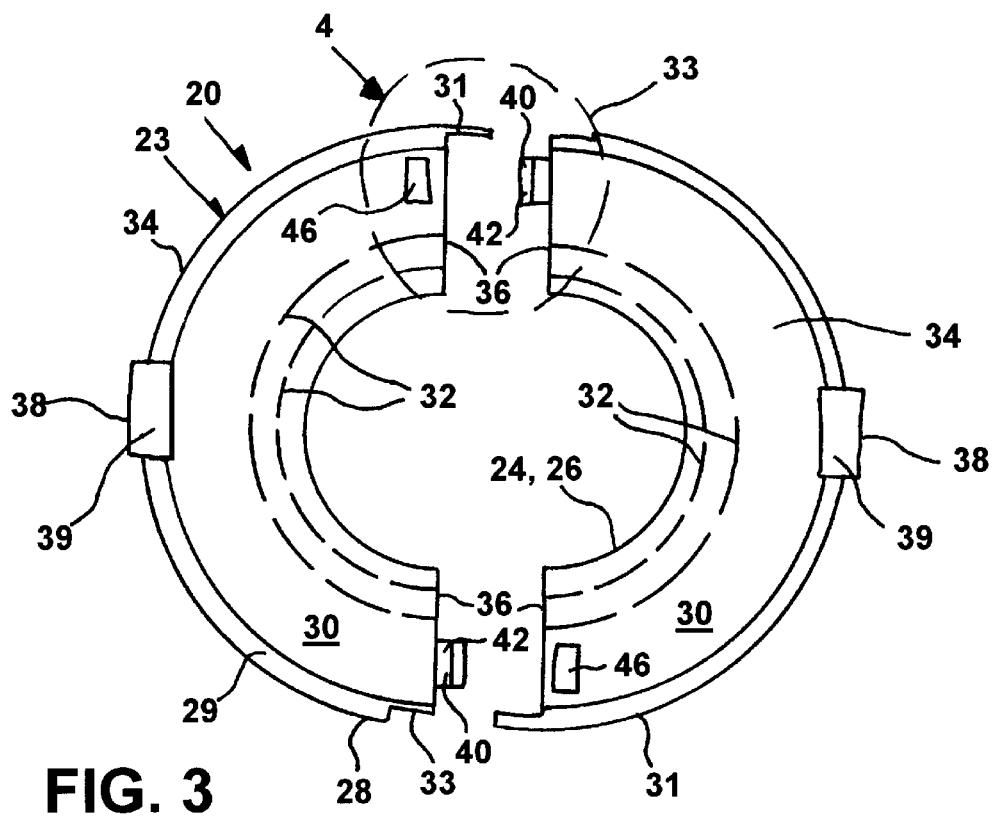
FIG. 3 is an enlarged exploded diagrammatic top plan view of the area generally enclosed by the dotted curve identified by ARROW 3 in FIG. 2 of the collar of the present invention.
Figure 4:
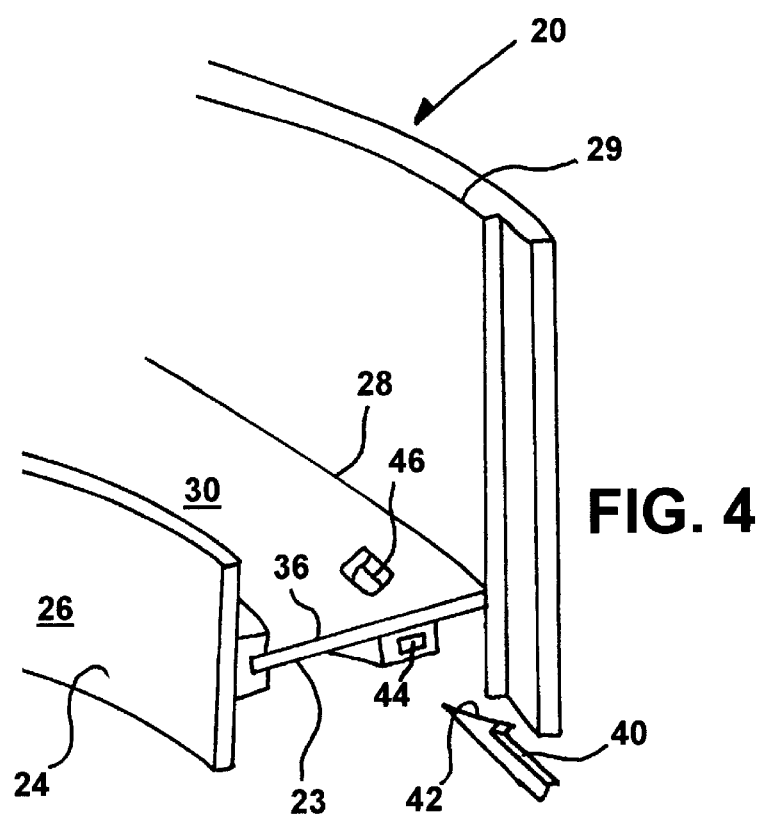
FIG. 4 is a diagrammatic perspective view of the area generally enclosed by the dotted curve identified by ARROW 4 in FIG. 3.

The specific configuration of the drill engaging-collar 20 can best be seen in FIGS. 3 and 4, which are, respectively, an enlarged exploded diagrammatic top plan view of the area generally enclosed by the dotted curve identified by ARROW 3 in FIG. 2 of the collar of the present invention, and a diagrammatic perspective view of the area generally enclosed by the dotted curve identified by ARROW 4 in FIG. 3, and as such, will be discussed with reference thereto.

The drill engaging-collar 20 comprises a disk 23 that has a drill receiving-throughbore 24 that extends centrally therethrough and which has a size and which is defined by a detachable inner circumferential wall 26 for detachably receiving the housing 16 of the power drill 12.

The disk 23 further has an outer periphery 28 with a fixed outer circumferential wall 29, a cup facing-surface 30, and concentric break lines 32 for adjusting the size of the drill receiving-throughbore 24 therein to accommodate for the housings 16 of different sized power drills 12, and when an appropriate break line 32 is broken to define an appropriate drill receiving-throughbore 24, the inner circumferential wall 26 is reattached to define the newly defined drill receiving-throughbore 24.

The disk 23 is divided diametrically into two identical halves 34 that have ends 36 that abut each other, respectively.

The outer circumferential wall 29 of each half 34 extends circumferentially past one end 36 so as to form a disk-engaging-prong 31 and circumferentially short of the other end 36 so as to define a disk-engaging recess 33.

Each half 34 has a cup engaging-tab 38 that extends axially from the cup facing surface 30, is disposed on the outer circumferential wall 29, midway between associated ends 36, detachably engages the cup 22, and terminally widens into a wedge 39.

Each half 34 further has a disk engaging-tab 40 that extends circumferentially from one end 36, and is disposed in close proximity of the outer circumferential wall 29.

The disk engaging-tab 40 originates coplanarly with the one end 36 then terminally heightens into a wedge 42.

Each half 34 further has a disk engaging-sleeve 44 that extends circumferentially under the other end 36, and is disposed in close proximity of the outer circumferential wall 29.

Each half 34 further has a disk engaging-bore 46 that extends through the other end 36, is disposed in close proximity of the outer circumferential wall 29, communicates with an associated disk engaging-sleeve 44, and detachably receives the wedge 42 of the disk engaging-tab 40 of the other half 34 when the disk engaging-tab 40 is inserted into the disk engaging-sleeve 44, with the prong 31 of a half 34 engaging in the recess 33 in the other half 34, so as to maintain the halves 34 together and coplanar while allowing for removal from and engagement with the power drill 12.

The specific configuration of the debris capturing-cup 22 can best be seen in FIG. 2, and as such, will be discussed with reference thereto.

The debris capturing cup 22 comprises a plurality of telescopic sleeves 48 that are biased to an extended position by interconnecting springs 50, with an outermost sleeve 48 for contacting the workpiece 14.

The plurality of telescopic sleeves 48 retract accordingly against biasing of the springs 50 as the power drill 12 drills into the workpiece 14 so as to assure that the debris capturing-cup 22 is always in contact with the workpiece 14 during drilling.

An innermost sleeve 48 has an inner terminal edge 52 that abuts the drill engaging-collar 20, and a pair of cup engaging-bores 54 that are diametrically opposed to each other, disposed slightly outward of the inner terminal edge 52, and detachably receive the wedges 39 of the cup engaging-tabs 38 so as to maintain the debris capturing-cup 22 on the drill engaging-collar 20 while allowing for removal of the debris capturing-cup 22 from the drill engaging-collar 20 during installation of the drill engaging-collar 20 onto the power drill 12.

It will be understood that each of the elements described above, or two or more together, may also find a useful application in other types of constructions differing from the types described above.

While the invention has been illustrated and described as embodied in a debris capturing device for a drill, however, it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. A debris capturing device for a power drill for drilling into a workpiece, wherein the power drill has a housing and a chuck, said device comprising:
    a) a drill engaging-collar comprising a disk having a drill receiving-throughbore extending centrally therethrough and having a size and being defined by a detachable inner circumferential wall for detachably receiving the housing of the power drill; and
    b) a debris capturing-cup detachably extending axially from said drill engaging-collar for encircling the chuck of the power drill and for contacting the workpiece so as to allow debris created from the power drill drilling into the workpiece to be captured therein.

2. The device as defined in claim 1, wherein said drill engaging-collar is for detachably engaging around the housing of the power drill, just behind the chuck of the power drill.

3. The device as defined in claim 1, wherein said drill engaging-collar is integrally formed with and around the housing of the power drill, just behind the chuck of the power drill.

4. The device as defined in claim 1, wherein said disk further has:
    a) an outer periphery with a fixed outer circumferential wall;
    b) a cup facing-surface; and
    c) concentric break lines for adjusting said size of said drill receiving-throughbore to accommodate for the housings of different sized power drills, and when an appropriate break line is broken to define an appropriate drill receiving-throughbore, said inner circumferential wall is reattached to define a newly defined drill receiving-throughbore.

5. The device as defined in claim 4, wherein said disk is divided diametrically into two identical halves that have ends that abut each other, respectively.

6. The device as defined in claim 5, wherein said outer circumferential wall of each half extends circumferentially past one end so as to form a disk-engaging-prong and circumferentially short of the other end so as to define a disk-engaging recess.

7. The device as defined in claim 5, wherein each half has a cup engaging-tab that extends axially from said cup facing surface, is disposed on said outer circumferential wall, midway between associated ends, detachably engages said cup, and terminally widens into a wedge.

8. The device as defined in claim 6, wherein each half has a disk engaging-tab that extends circumferentially from one end, and is disposed in close proximity of said outer circumferential wall.

9. The device as defined in claim 8, wherein said disk engaging-tab originates coplanarly with said one end than terminally heightens into a wedge.

10. The device as defined in claim 9, wherein each half further has a disk engaging-sleeve that extends circumferentially under said other end, and is disposed in close proximity of said outer circumferential wall.

11. The device as defined in claim 10, wherein each half further has a disk engaging-bore that extends through said other end, is disposed in close proximity of said outer circumferential wall, communicates with an associated disk engaging-sleeve, and detachably receives said wedge of said disk engaging-tab of the other half when said disk engaging-tab is inserted into said disk engaging-sleeve, with said prong of a half engaging in said recess in the other half, so as to maintain said halves together and coplanar while allowing for removal from and engagement with the power drill.

12. The device as defined in claim 7, wherein said debris capturing cup comprises a plurality of telescopic sleeves that are biased to an extended position by interconnecting springs, with an outermost sleeve for contacting the workpiece.

13. The device as defined in claim 12, wherein said plurality of telescopic sleeves retract accordingly against biasing of said springs as the power drill drills into the workpiece so as to assure that said debris capturing-cup is always in contact with the workpiece during drilling.

14. The device as defined in claim 12, wherein an innermost sleeve has:
    a) an inner terminal edge that abuts said drill engaging-collar; and
    b) a pair of cup engaging-bores that are diametrically opposed to each other, disposed slightly outward of said inner terminal edge, and detachably receive said wedges of said cup engaging-tabs so as to maintain said debris capturing-cup on said drill engaging-collar while allowing for removal of said debris capturing-cup from said drill engaging-collar during installation of said drill engaging-collar onto the power drill.

* * * * *